(12) United States Patent
Kusaka

(10) Patent No.: US 7,475,720 B2
(45) Date of Patent: Jan. 13, 2009

(54) AIR CONDITIONER FOR VEHICLES

(75) Inventor: Naoki Kusaka, Kawachi-gun (JP)

(73) Assignee: Keihin Corporation, Tokyo (JP)

( * ) Notice: Subject to any disclaimer, the term of this patent is extended or adjusted under 35 U.S.C. 154(b) by 499 days.

(21) Appl. No.: 10/891,891

(22) Filed: Jul. 14, 2004

(65) Prior Publication Data
US 2005/0039903 A1  Feb. 24, 2005

(30) Foreign Application Priority Data
Jul. 14, 2003  (JP) .............................. 2003-273836

(51) Int. Cl.
*B60H 1/00* (2006.01)
(52) U.S. Cl. .......................... 165/204; 165/202; 165/42
(58) Field of Classification Search ................... 165/42, 165/43, 44, 202, 203, 204
See application file for complete search history.

(56) References Cited

U.S. PATENT DOCUMENTS

| | | | |
|---|---|---|---|
| 4,852,638 | A | 8/1989 | Hildebrand et al. |
| 4,972,992 | A * | 11/1990 | Scheidel et al. ............... 165/42 |
| 6,106,386 | A | 8/2000 | Schwarz |
| 6,386,966 | B1 | 5/2002 | Kuwayama et al. |
| 6,889,761 | B2 * | 5/2005 | Perry et al. ................. 165/202 |

FOREIGN PATENT DOCUMENTS

| | | |
|---|---|---|
| DE | 19881087 T1 | 9/1999 |
| DE | 19908998 A1 | 9/1999 |
| DE | 10031991 A1 | 1/2002 |
| DE | 10147112 A1 | 4/2003 |
| EP | 1 312 493 | 5/2003 |
| GB | 2329706 | 3/1999 |
| JP | 60-215415 | 10/1985 |
| JP | 62-46706 | 2/1987 |
| JP | 62-178418 | 8/1987 |
| JP | 04-095520 | 3/1992 |
| JP | 10-236134 | 9/1998 |
| JP | 10-264638 | 10/1998 |
| JP | 10-338019 | 12/1998 |
| JP | 11-011135 | 1/1999 |
| JP | 11-342721 | 12/1999 |
| JP | 2000-33814 | 2/2000 |
| JP | 2001-71737 | 3/2001 |

OTHER PUBLICATIONS

Japanese Office Action for Application No. 2003-273836, dated Aug. 1, 2006.
U.S. Appl. No. 11/523,923, Tarukawa, Y.
Japanese Office Action for Application No. 2003-273836, dated Feb. 27, 2007.
Japanese Office Action for U.S. Appl. No. 2005-271800, dated Jul. 8, 2008.

* cited by examiner

*Primary Examiner*—Ljiljana (Lil) V Ciric
(74) *Attorney, Agent, or Firm*—Lahive & Cockfield, LLP; Anthony A. Laurentano, Esq.

(57) ABSTRACT

Cooled air introduced from an evaporator through a first passage is divided into laminar flows by a guide assembly mounted on an air mixing door, and is changed in direction thereby and supplied to a mixing region. Warmed air introduced from a heater core through a third passage is divided into laminar flows by the guide assembly, and is changed in direction thereby and supplied to the mixing region. The mixing region mixes the cooled air and the warmed air with each other, and delivers uniformly mixed air into a passenger compartment via a face outlet, a defroster outlet, or a foot outlet.

8 Claims, 6 Drawing Sheets

AIR CONDITIONER FOR VEHICLES

BACKGROUND OF THE INVENTION

1. Field of the Invention

The present invention relates to a vehicular air conditioner having a cooling means, a heating means, and an air-mixing door.

2. Description of the Related Art

Vehicular air conditioners installed on vehicles adjust the temperature and humidity in the passenger compartment by mixing air cooled by an evaporator and air heated by a heater core at a desired mixing ratio and delivering the mixed air from a defroster outlet, a face outlet, or a foot outlet into the passenger compartment. For increasing the comfort of occupants or passengers in the passenger compartment, it is necessary to mix the cooled air and the warmed air in as good a state as possible.

FIG. 4 of the accompanying drawings shows in cross section a vehicular air conditioner 2 having a mechanism for mixing cooled air and warmed air at a suitable mixing ratio and supplying the mixed air to the passenger compartment (see Japanese laid-open patent publication No. 11-342721). Air cooled by an evaporator 4 is introduced by an air mixing door 10 into a first passage 12 or a second passage 14. The air introduced into the first passage 12 is heated by a heater core 6 and then introduced by an outlet door 16 into a third passage 18 or a fourth passage 20. The air introduced into the fourth passage 20 is supplied to a face outlet 22. The air introduced into the third passage 18 is supplied by an outlet door 24 to a defroster outlet 26 or a foot outlet 28. Curved guide plates 32 are mounted by stays 30 on a surface of the outlet door 16 which faces the third passage 18.

When the outlet door 16 is positioned as shown in FIG. 4, the air heated into warmed air by the heater core 6 is changed in direction by the guide plates 32 and introduced into the third passage 18. The air supplied as cooled air to the second passage 14 is introduced across the stays 30 into the third passage 18. Since the warmed air and the cooled air that are supplied to the third passage 18 at this time are separated from each other by the guide plates 32, the warmed air supplied from the heater core 6 is introduced into the third passage 18 without being blocked by the cooled air introduced from the second passage 14. Therefore, the warmed air and the cooled air can be mixed with each other in the third passage 18 without staying stagnant and suffering increased resistance, and can be supplied to the defroster outlet 26 or the foot outlet 28.

FIG. 5 of the accompanying drawings shows a vehicular air conditioner 34 (see Japanese laid-open patent publication No. 4-95520). In the vehicular air conditioner 34, air cooled by an evaporator 36 is supplied to a bypass passage 38 and also supplied by an air mixing door 40 to a heater core 42. A bypass door 44 mixes the air introduced into the bypass passage 38 with the air heated by the heater core 42, and the mixed air is supplied by an outlet door 46 or 48 to a face outlet 50 or a foot outlet 52. As shown in FIG. 6 of the accompanying drawings, the bypass door 44 comprises a plurality of juxtaposed parallel sectorial walls 54 which are joined by successive partitions 56 that are alternately positioned on opposite sides of the walls 54.

The warmed air introduced from the heater core 42 and the cooled air introduced from the bypass passage 38 are changed in direction by the partitions 56 and supplied to the face outlet 50 or the foot outlet 52. Since the warmed air and the cooled air flowing along the bypass door 44 are divided into laminar flows by the walls 54, they can be mixed into a uniform stream of air.

With the vehicular air conditioner 2 shown in FIG. 4, the guide plates 32 mounted on the outlet door 16 separate the warmed air supplied from the heater core 6 and the cooled air supplied from the second passage 14, allowing the warmed air to be introduced at a desired rate into the third passage 18 without being blocked by the cooled air. For mixing the warmed air and the cooled air appropriately with each other, it is necessary that the distance from the third passage 18 to the defroster outlet 26 or the foot outlet 28 be increased. As a result, the vehicular air conditioner 2 is relatively large in size.

Furthermore, since the warmed air and the cooled air are separated from each other by the guide plates 32, when a foot/defroster mode for ejecting air from both the defroster outlet 26 and the foot outlet 28 is selected, the temperature of the air ejected from the defroster outlet 26 and the temperature of the air ejected from the foot outlet 28 are largely different from each other, tending to make the passengers feel uncomfortable.

As the guide plates 32 are mounted only on the side of the outlet door 16 which faces the third passage 18, when a bi-level mode for ejecting air from both the face outlet 22 and the foot outlet 28 is selected, the temperature of the air ejected from the face outlet 22 and the temperature of the air ejected from the foot outlet 28 are also largely different from each other.

With the vehicular air conditioner 34 shown in FIGS. 5 and 6, when air is ejected from either the face outlet 50 or the foot outlet 52, since the warmed air and the cooled air are appropriately mixed with each other by the bypass door 44, the mixed air with little temperature differences is ejected. However, when a bi-level mode for ejecting air from both the face outlet 50 and the foot outlet 52 is selected, the bypass door 40 presents itself as an obstacle, increasing the temperature difference between the air ejected from the face outlet 50 and the air ejected from the foot outlet 52.

SUMMARY OF THE INVENTION

It is a general object of the present invention to provide a vehicular air conditioner which is capable of mixing air cooled by a cooling means and air heated by a heating means appropriately with each other and ejecting the mixed air from an outlet.

A major object of the present invention is to provide a vehicular air conditioner which is relatively small in size and is capable of mixing cooled air and warmed air appropriately with each other and ejecting the mixed air from an outlet.

Another object of the present invention is to provide a vehicular air conditioner for ejecting air simultaneously from a plurality of outlets without developing significant temperature differences so as to prevent vehicle occupants from feeling uncomfortable.

Still another object of the present invention is to provide a vehicular air conditioner which is capable of reducing the temperature difference between air ejected from a defroster outlet and air ejected from a foot outlet, or between air ejected from a face outlet and air ejected from the foot outlet.

According to the present invention, cooled air cooled by a cooling means is supplied from a first passage to a guide assembly on an air mixing door and is changed in direction thereby, and air introduced from a second passage and heated by a heating means is supplied as warmed air from a third passage to the guide assembly and is changed in direction thereby. The cooled air and the warmed air are mixed with each other by a mixing region, which delivers the mixed air to outlets.

The guide assembly has a first wall disposed in an area closer to the third passage and a second wall disposed in an area closer to the first passage, providing a region where the cooled air and the warmed air are mixed with each other. The first and second walls may be disposed as single walls in the respective areas or may be disposed as a plurality of walls in each of the respective areas.

The first walls and the second walls are interconnected alternately by third walls to provide a labyrinth structure for better mixing the cooled air and the warmed air. The third walls have respective central portions projecting from the air mixing door by a distance that is smaller than portions of the third walls which are connected to the first walls and the second walls. Since the cooled air and the warmed air flow beyond the third walls at their central portions, the cooled air and the warmed air are much better mixed with each other.

With the vehicular air conditioner according to the present invention, the guide assembly mounted on the air mixing door which is supplied with both the cooled air and the warmed air is effective to mix the cooled air and the warmed air appropriately with each other. When the mixed air is delivered simultaneously from the outlets into a passenger compartment, any temperature differences in the mixed air are minimized to prevent passengers from feeling uncomfortable in the passenger compartment. As the cooled air and the warmed air can immediately be mixed with each other by the guide assembly, no extra space is needed in the vehicular air conditioner for mixing the cooled air and the warmed air, and hence the vehicular air conditioner is relatively small in size.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
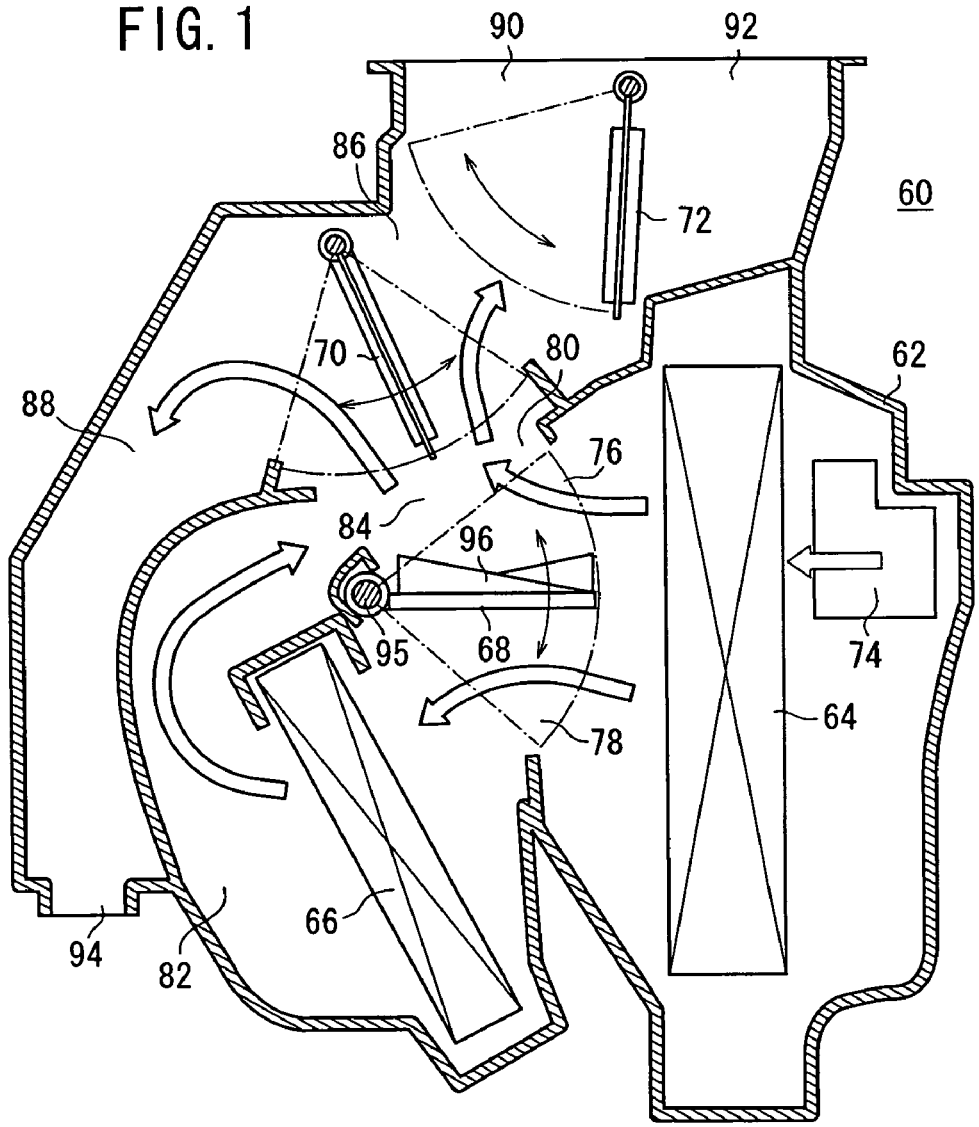
FIG. 1 is a cross-sectional view of a vehicular air conditioner according to an embodiment of the present invention.

FIG. 1 shows in cross section a vehicular air conditioner 60 according to an embodiment of the present invention for air-conditioning the passenger compartment of a vehicle.

As shown in FIG. 1, the vehicular air conditioner 60 has an evaporator 64 (cooling means) for cooling air, a heater core 66 (heating means) for heating air, an air mixing door 68 for mixing cooled air and warmed air at a predetermined mixing ratio into mixed air, and outlet doors 70, 72 (switching doors) for selecting outlets for the mixed air, all accommodated in a housing 62 which provides air passages therein.

An air inlet 74 for being supplied with air from a blower fan (not shown) is defined in the housing 62 upstream of the evaporator 64. The region downstream of the evaporator 64 is branched into a first passage 76 and a second passage 78 by the air mixing door 68. The first passage 76 communicates with an opening 80 whose opening is adjusted by the air mixing door 68. The heater core 66 is disposed downstream of the second passage 78. A third passage 82 which is bent and communicates with the opening 80 extends downstream of the heater core 66.

The third passage 82 communicates with the opening 80 in a mixing region 84 where cooled air and warmed air are mixed with each other. The mixing region 84 is combined with an outlet door 70 which provides selective communication between the mixing region 84 and a fourth passage 86 and/or a fifth passage 88. The fourth passage 86 communicates with a face outlet 90 and a defroster outlet 92 through an outlet door 72. The fifth passage 88 communicates with a foot outlet 94.

Figure 2:
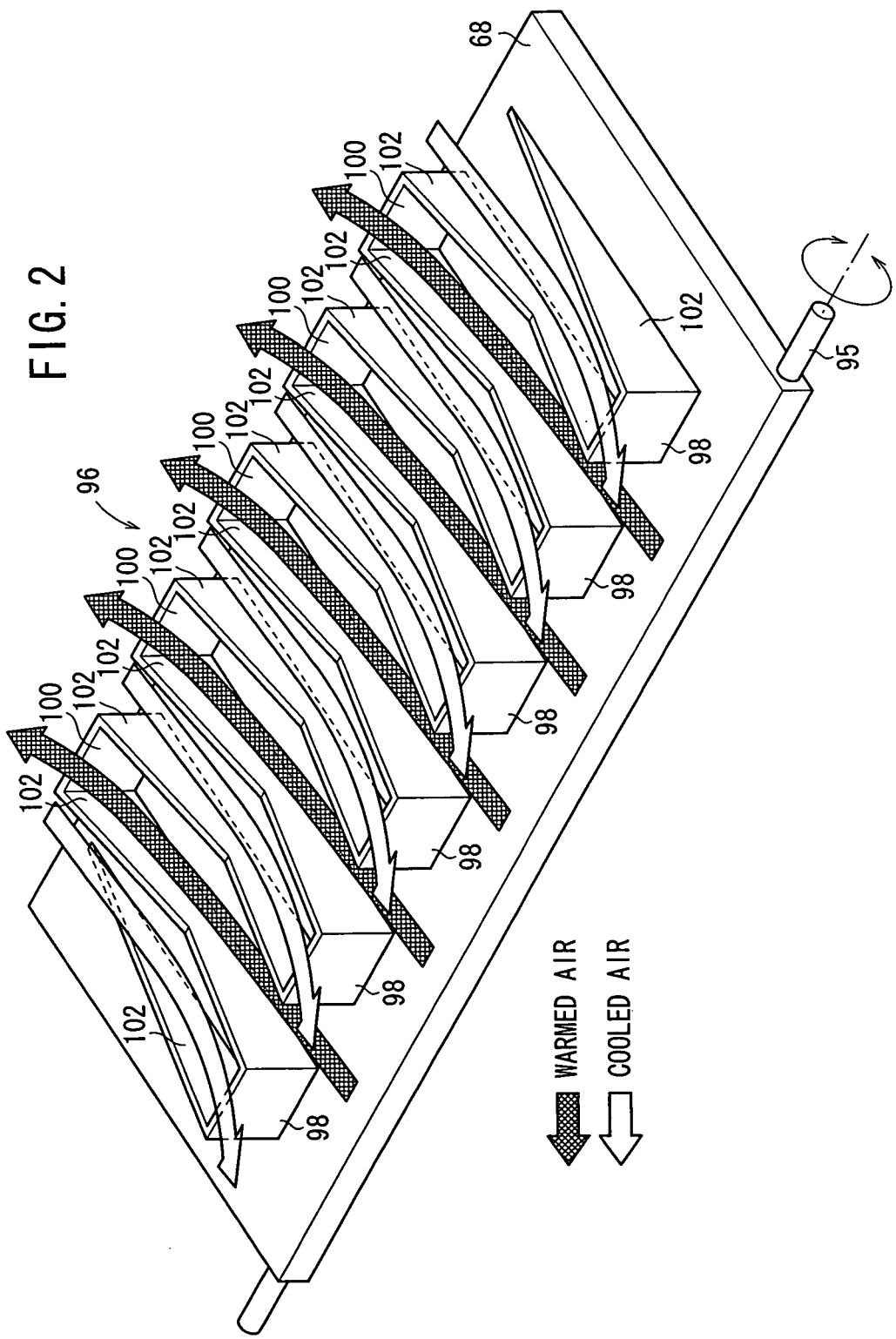
FIG. 2 is a perspective view of a guide assembly on an air mixing door of the vehicular air conditioner according to the embodiment.

The air mixing door 68 is angularly movable about a support shaft 95. The air mixing door 68 supports on its surface facing the first passage 76 a guide assembly 96 shown in FIG. 2. As shown in FIG. 2, the guide assembly 96 comprises a plurality of first walls 98 disposed in an area thereof closer to the third passage 82 for changing the direction of cooled air introduced from the first passage 76 toward the mixing region 84, a plurality of second walls 100 disposed in an area thereof closer to the first passage 76 for changing the direction of warmed air introduced from the third passage 82 toward the mixing region 84, and a plurality of third walls 102 alternately interconnecting the first walls 98 and the second walls 100. The guide assembly 96 thus provides a labyrinth structure made up of the first walls 98, the second walls 100, and the third walls 102. The third walls 102 project from the air mixing door 68 by a distance which is progressively smaller from their ends connected to the first walls 98 and the second walls 100 toward their central portions.

The vehicular air conditioner 60 according to the present embodiment is basically constructed as described above. Operation and advantages of the vehicular air conditioner 60 will be described below.

When the vehicular air conditioner 60 starts to operate, the non-illustrated blower fan rotates to introduce air from the inlet 74 into the housing 62 of the vehicular air conditioner 60. The introduced air is cooled by the evaporator 64 when is passes through the evaporator 64, and is supplied as cooled air to the first passage 76 and/or the second passage 78.

If the air mixing door 68 is positioned as shown in FIG. 1, then the cooled air supplied to the first passage 76 is introduced into the mixing region 84 by the guide assembly 96 on the air mixing door 68. The cooled air supplied to the second passage 78 is heated into warmed air by passing through the heater core 66, and the warmed air is introduced from the third passage 82 into the mixing region 84 by the guide assembly 96 on the air mixing door 68.

Figure 3:
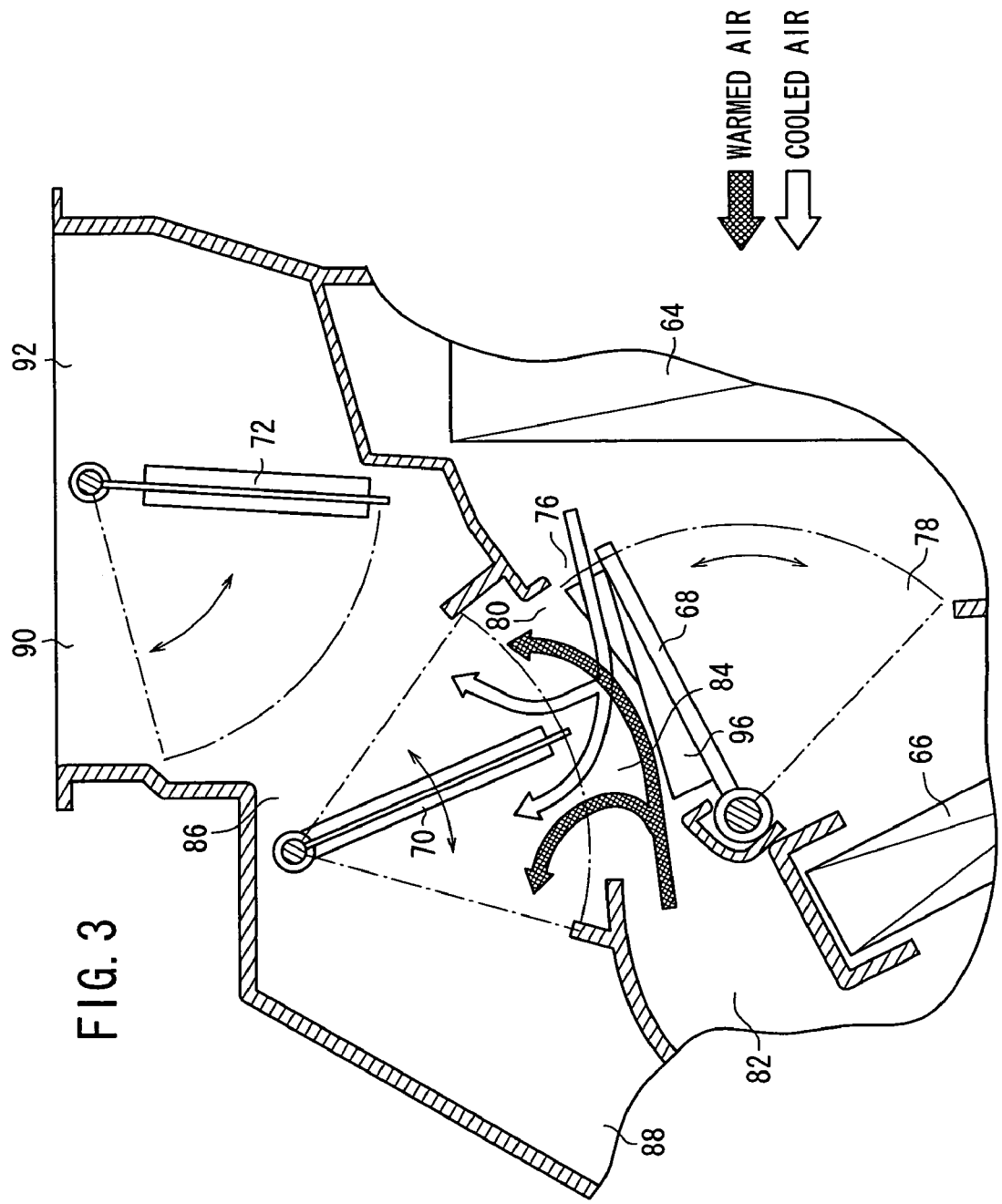
FIG. 3 is a fragmentary cross-sectional view showing the manner in which the guide assembly on the air mixing door operates.
Figure 4:
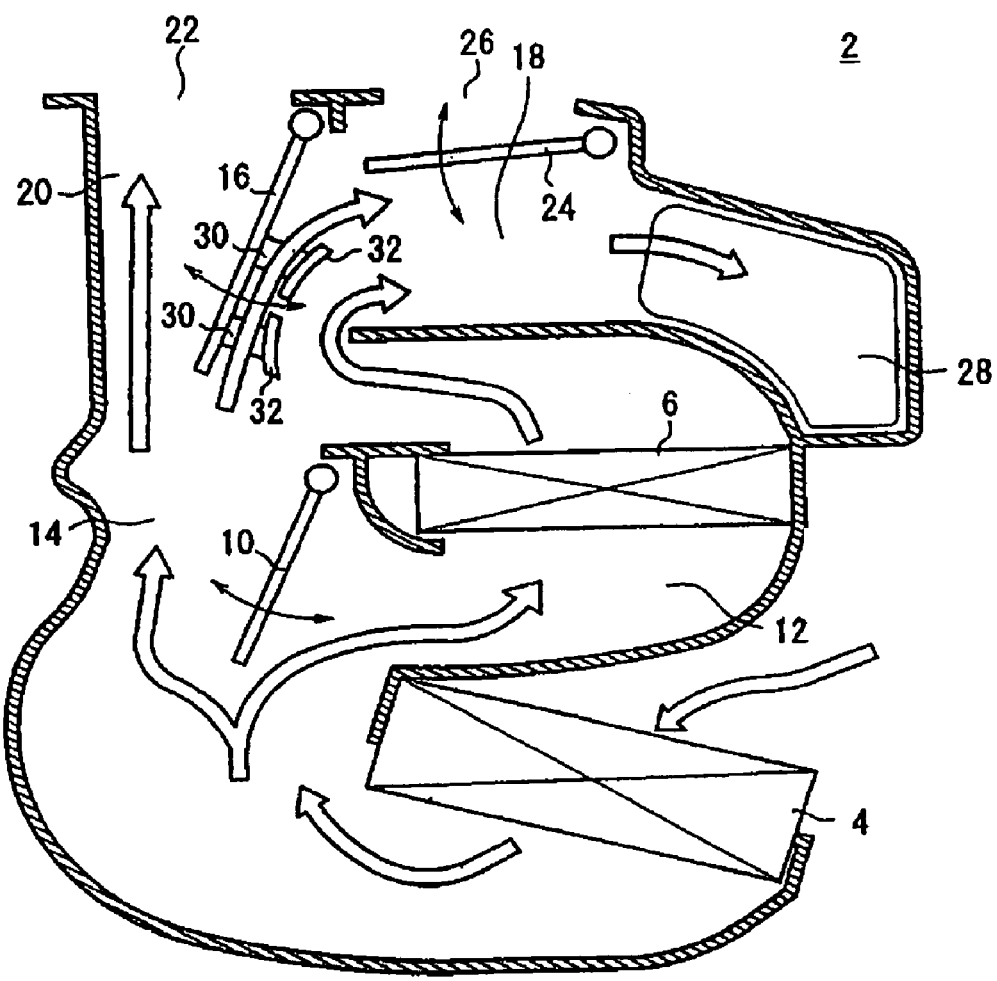
FIG. 4 is a cross-sectional view of a conventional vehicular air conditioner.
Figure 5:
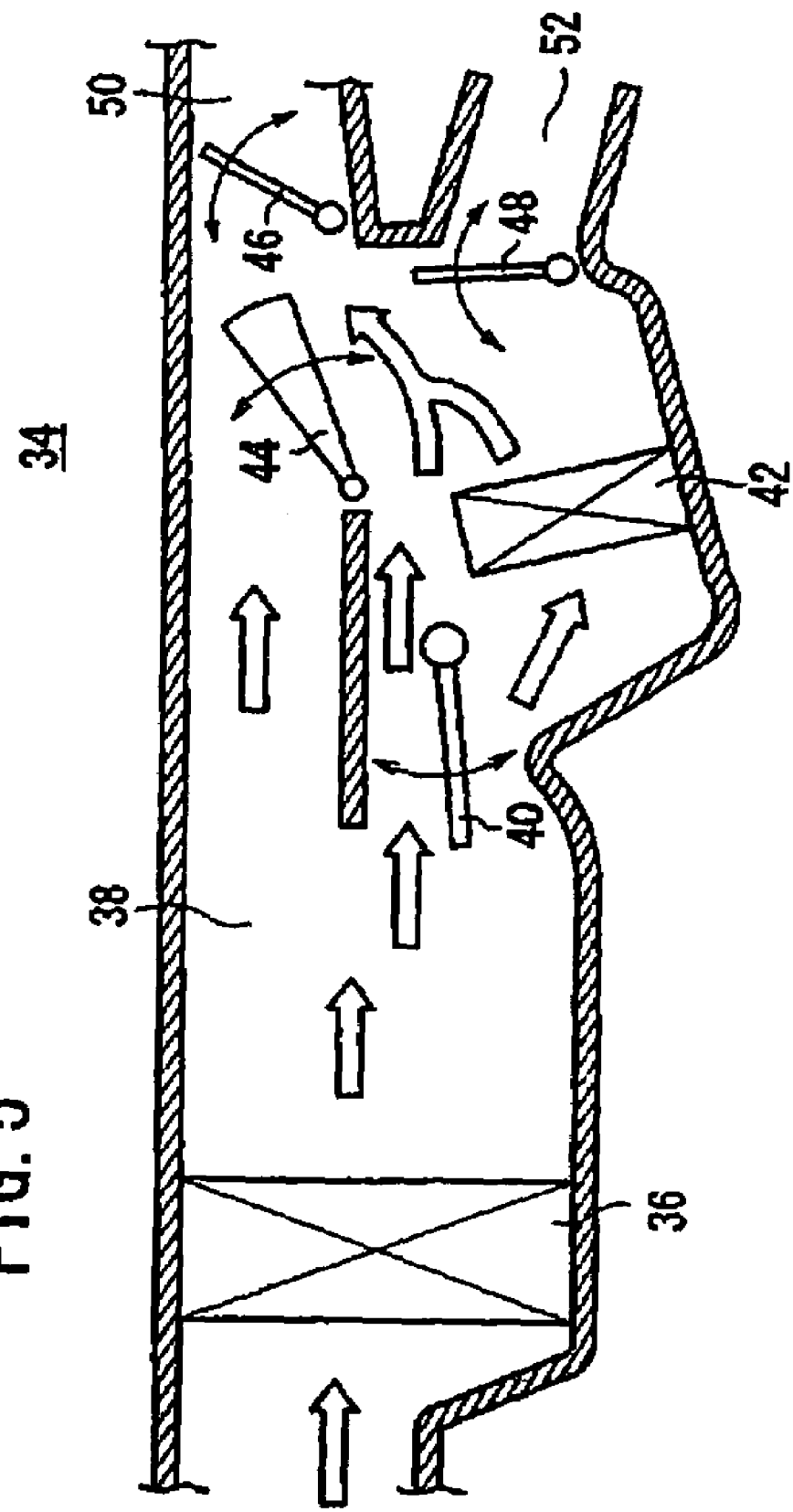
FIG. 5 is a cross-sectional view of another conventional vehicular air conditioner.
Figure 6:
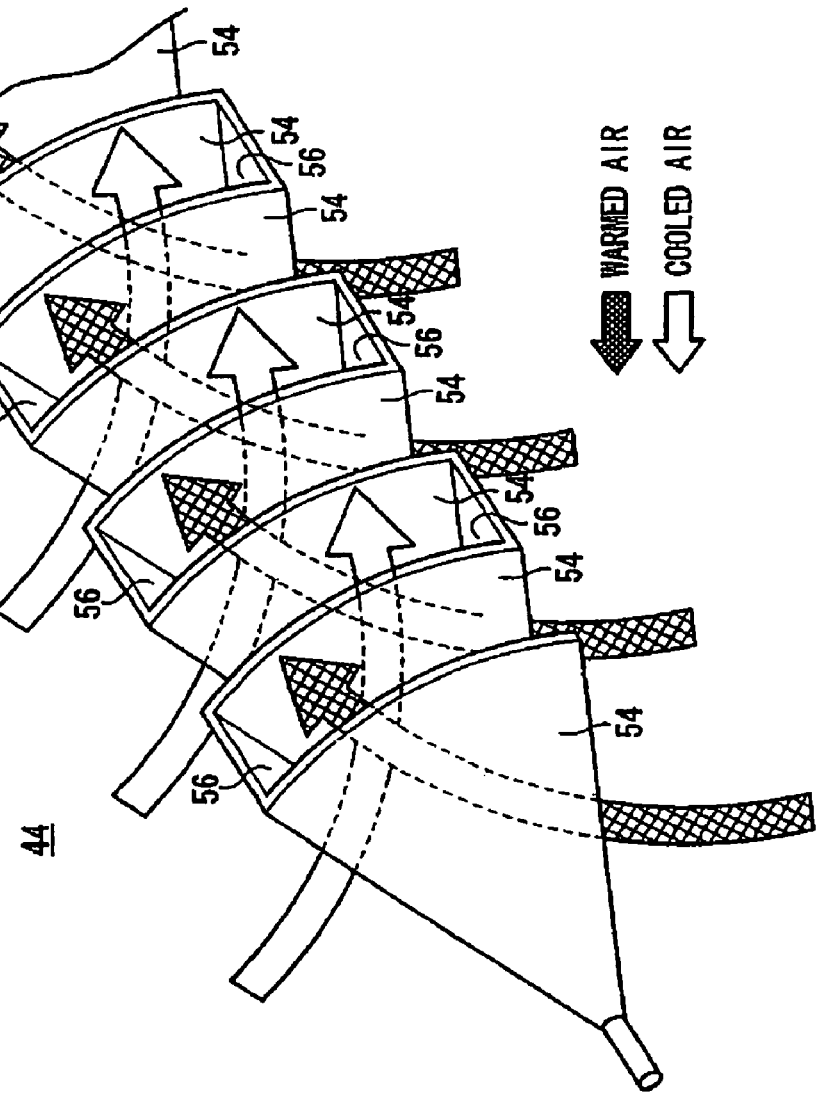
FIG. 6 is a perspective view of a bypass door of the conventional vehicular air conditioner shown in FIG. 5.

An action of the guide assembly 96 to mix the cooled air and the warmed air will be described below with reference to FIGS. 2 and 3.

The cooled air supplied from the first passage 76 to the guide assembly 96 is divided into laminar flows by the third walls 102, and is caused by the first walls 98 closer to the third passage 82 to change its direction so as to flow toward the mixing region 84. The warmed air supplied from the third passage 82 to the guide assembly 96 is divided into laminar flows by the second walls 100 closer to the first passage 76, and is caused by the second walls 100 to change its direction so as to flow toward the toward the mixing region 84. Since the first walls 98 and the second walls 100 are interconnected alternately by the third walls 102, the cooled air or the warmed air is not directly delivered into the fifth passage 88 or the fourth passage 86. As a result, the cooled air and the warmed air are appropriately mixed with each other in the mixing region 84. Since the central portions of the third walls 102 project from the air mixing door 68 by a distance smaller than the ends of the third walls 102 where the cooled air and the warmed air are introduced, the cooled air and the warmed air are mixed with each other better at the central portions of the third walls 102. The mixed air that is produced when the cooled air and the warmed air are mixed with each other in the mixing region 84 is then delivered into the passenger compartment from the face outlet 90, the defroster outlet 92, or the foot outlet 94 which is selected by settings of the vehicular air conditioner 60.

If the vehicular air conditioner 60 is set to a bi-level mode where the outlet door 70 provides communication between the mixing region 84 and the fourth passage 86 and also provides communication between the mixing region 84 and the fifth passage 88, and the outlet door 72 opens the face outlet 90, then the mixed air from the mixing region 84 is delivered through the fourth passage 86 into the passenger compartment via the face outlet 90 and is also delivered through the fifth passage 88 into the passenger compartment via the foot outlet 94. If the outlet door 70 is positioned as shown in FIG. 1 and the vehicular air conditioner 60 is set to a foot defrosting mode where the outlet door 72 opens the defroster outlet 92, then the mixed air is delivered through the fourth passage 86 into the passenger compartment via the defroster outlet 92 and is also delivered through the fifth passage 88 into the passenger compartment via the foot outlet 94.

Since the cooled air and the warmed air are well mixed with each other by the guide assembly 96 on the air mixing door 68, the difference between the temperature of the mixed air delivered from the face outlet 90 or the defroster outlet 92 and the temperature of the mixed air delivered from the foot outlet 94 is small in either the bi-level mode or the foot defrosting mode. Therefore, the passenger compartment can appropriately be air-conditioned without making the passengers feel uncomfortable.

Table 1 given below shows measured temperature differences (° C.) between the face outlet 90 and the foot outlet 94 with the guide assembly 94 (A) and without the guide assembly 94 (B) when the opening of the air mixing door 68 (the opening angle from the heater core 66) is changed at intervals of 5% within the range from 40% to 65% in the bi-level mode. It can be seen from Table 1 that the temperature differences are smaller with the guide assembly 94 employed according to the present embodiment.

TABLE 1

| | Door opening [%] | | | | | |
|---|---|---|---|---|---|---|
| | 40 | 45 | 50 | 55 | 60 | 65 |
| (A) with guide assembly [° C.] | 16.8 | 21.6 | 28.1 | 30.0 | 34.3 | 32.3 |
| (B) without guide assembly [° C.] | 13.6 | 15.7 | 18.9 | 21.4 | 26.9 | 29.4 |
| (A) − (B) [° C.] | 3.2 | 5.9 | 9.2 | 8.6 | 7.4 | 3.0 |

Although a certain preferred embodiment of the present invention has been shown and described in detail, it should be understood that various changes and modifications may be made therein without departing from the scope of the appended claims.

What is claimed is:

1. A vehicular air conditioner comprising:
    cooling means for cooling air and supplying the cooled air;
    heating means for heating air and supplying the warmed air;
    a one-piece air mixing door which is displaceably positioned between said cooling means and said heating means, divides said cooled air depending on a position of said air mixing door, and supplies said cooled air to a mixing region and said heating means, respectively, said air mixing door mixing the cooled air and the warmed air with each other at a predetermined mixing ratio in said mixing region;
    outlets for delivering the air mixed at said predetermined mixing ratio into respective regions;
    a first passage for supplying said cooled air from said cooling means to said mixing region;
    a second passage for supplying said cooled air from said cooling means to said heating means, said air mixing door being displaceably disposed between said first passage and said second passage;
    a third passage for supplying said warmed air from said heating means to said mixing region; and
    a guide assembly disposed on a surface of said air mixing door which faces said mixing region, for changing the direction of said cooled air supplied from said first passage toward said mixing region while changing the direction of said warmed air supplied from said third passage toward said mixing region thereby to mix said cooled air and said warmed air with each other.

2. A vehicular air conditioner according to claim 1, wherein said guide assembly comprises a first wall disposed in an area of said guide assembly closer to said third passage for changing the direction of said cooled air introduced from said first passage and a second wall disposed in an area of said guide assembly closer to said first passage for changing the direction of said warmed air introduced from said third passage.

3. A vehicular air conditioner according to claim 2, wherein said guide assembly further comprises a third wall interconnecting said first wall and said second wall, providing a labyrinth structure.

4. A vehicular air conditioner according to claim 3, wherein a central portion of said third wall is shorter than portions of said third wall which are connected to said first wall and said second wall.

5. A vehicular air conditioner according to claim 1, wherein said outlets are connected to said mixing region by switching doors.

6. A vehicular air conditioner according to claim 5, wherein said switching doors are arranged to provide simultaneous communication between said mixing region and said outlets.

7. A vehicular air conditioner according to claim 6, wherein said outlets include a defroster outlet and a foot outlet.

8. A vehicular air conditioner according to claim 6, wherein said outlets include a face outlet and a foot outlet.

* * * * *